(12) United States Patent
Bhosale et al.

(10) Patent No.: US 11,675,915 B2
(45) Date of Patent: Jun. 13, 2023

(54) PROTECTING DATA BASED ON A SENSITIVITY LEVEL FOR THE DATA

(71) Applicant: International Business Machines Corporation, Armonk, NY (US)

(72) Inventors: Nilesh P. Bhosale, Pune (IN); Joseph W. Dain, Vail, AZ (US); Gregory T. Kishi, Oro Valley, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 16/386,134

(22) Filed: Apr. 16, 2019

(65) Prior Publication Data

US 2020/0320208 A1 Oct. 8, 2020

Related U.S. Application Data

(63) Continuation-in-part of application No. 16/376,960, filed on Apr. 5, 2019.

(51) Int. Cl.
*G06F 21/62* (2013.01)
*G06N 3/08* (2023.01)
*G06F 21/57* (2013.01)

(52) U.S. Cl.
CPC ............ *G06F 21/62* (2013.01); *G06F 21/577* (2013.01); *G06N 3/08* (2013.01); *G06F 2221/034* (2013.01)

(58) Field of Classification Search
CPC .. G06F 21/62; G06F 21/577; G06F 2221/034; G06N 3/08

USPC .......................................................... 726/25
See application file for complete search history.

(56) References Cited

U.S. PATENT DOCUMENTS

| | | | |
|---|---|---|---|
| 8,219,998 B2 | 7/2012 | Taylor et al. | |
| 8,863,284 B1 * | 10/2014 | Polyakov | H04L 63/145 726/22 |
| 9,268,784 B1 * | 2/2016 | Guo | G06F 3/0671 |
| 9,355,256 B2 | 5/2016 | Chari et al. | |
| 9,355,257 B2 | 5/2016 | Chari et al. | |
| 9,787,717 B2 | 10/2017 | Abuelsaad et al. | |
| 9,881,167 B2 | 1/2018 | Chari et al. | |
| 9,881,168 B2 | 1/2018 | Chari et al. | |
| 9,973,536 B2 | 5/2018 | Foley et al. | |
| 10,104,097 B1 * | 10/2018 | Yumer | G06F 21/554 |
| 10,110,637 B2 | 10/2018 | Foley et al. | |
| 10,250,617 B1 * | 4/2019 | Gardner | G06N 3/08 |
| 10,397,279 B2 | 8/2019 | Foley et al. | |

(Continued)

OTHER PUBLICATIONS

Advisory Action from U.S. Appl. No. 16/376,960, dated Apr. 27, 2021.

(Continued)

*Primary Examiner* — Thanh T Le
(74) *Attorney, Agent, or Firm* — Zilka-Kotab, P.C.

(57) ABSTRACT

A computer-implemented method according to an aspect includes training a cognitive network, utilizing metadata associated with historic data threats, inputting metadata associated with a current data threat into the trained cognitive network, identifying, by the trained cognitive network, one or more stored instances of data determined to be vulnerable to the current data threat, and adjusting one or more security aspects of the one or more stored instances of data determined to be vulnerable to the current data threat.

25 Claims, 11 Drawing Sheets

(56) References Cited

U.S. PATENT DOCUMENTS

| | | | |
|---|---|---|---|
| 10,467,432 B2* | 11/2019 | Barday | G06F 21/552 |
| 10,503,908 B1* | 12/2019 | Bellis | G06F 16/9032 |
| 10,534,918 B1* | 1/2020 | Davidi | G06F 21/577 |
| 10,546,123 B1* | 1/2020 | Lan | G06F 21/568 |
| 10,565,161 B2* | 2/2020 | Barday | G06F 15/76 |
| 10,691,814 B2* | 6/2020 | Tseitlin | G06F 21/577 |
| 11,195,101 B2 | 12/2021 | Patel et al. | |
| 11,210,266 B2 | 12/2021 | Dain et al. | |
| 11,301,578 B2 | 4/2022 | Bhosale et al. | |
| 2007/0021112 A1 | 1/2007 | Byrne et al. | |
| 2007/0185938 A1 | 8/2007 | Prahlad et al. | |
| 2013/0014278 A1 | 1/2013 | Jin et al. | |
| 2013/0241652 A1 | 9/2013 | Chi et al. | |
| 2013/0275803 A1 | 10/2013 | Kern et al. | |
| 2014/0007242 A1 | 1/2014 | Carter et al. | |
| 2014/0020110 A1 | 1/2014 | Bank et al. | |
| 2014/0143219 A1 | 5/2014 | Therrien et al. | |
| 2014/0181982 A1* | 6/2014 | Guo | G06F 21/60 726/25 |
| 2014/0189865 A1 | 7/2014 | Abuelsaad et al. | |
| 2014/0196103 A1 | 7/2014 | Chari et al. | |
| 2014/0250534 A1 | 9/2014 | Flores | |
| 2014/0304199 A1 | 10/2014 | Chari et al. | |
| 2014/0304821 A1 | 10/2014 | Chari et al. | |
| 2014/0337345 A1* | 11/2014 | Motoyama | G06V 30/224 707/738 |
| 2014/0373104 A1 | 12/2014 | Gaddam et al. | |
| 2015/0033221 A1 | 1/2015 | Chari et al. | |
| 2015/0033223 A1 | 1/2015 | Chari et al. | |
| 2015/0098867 A1 | 4/2015 | Aldereguia et al. | |
| 2015/0100521 A1 | 4/2015 | Kozloski et al. | |
| 2015/0128274 A1* | 5/2015 | Giokas | H04L 51/212 726/23 |
| 2015/0264054 A1 | 9/2015 | DeLuca et al. | |
| 2015/0264084 A1* | 9/2015 | Kashyap | H04L 63/1483 726/22 |
| 2015/0326616 A1 | 11/2015 | Foley et al. | |
| 2016/0269418 A1* | 9/2016 | Sangary | G06F 21/44 |
| 2016/0300065 A1* | 10/2016 | Bang | G06F 21/577 |
| 2016/0300227 A1* | 10/2016 | Subhedar | G06Q 20/384 |
| 2017/0060694 A1* | 3/2017 | Makhov | G06F 16/113 |
| 2017/0068812 A1 | 3/2017 | Zhai et al. | |
| 2017/0076096 A1 | 3/2017 | Challener et al. | |
| 2017/0149624 A1 | 5/2017 | Chitti et al. | |
| 2017/0177867 A1* | 6/2017 | Crofton | G06F 21/565 |
| 2017/0243008 A1* | 8/2017 | Cornell | H04L 63/1408 |
| 2017/0300698 A1* | 10/2017 | Chawla | G06F 21/577 |
| 2017/0322733 A1 | 11/2017 | Resch | |
| 2018/0063181 A1* | 3/2018 | Jones | H04L 63/1441 |
| 2018/0075239 A1 | 3/2018 | Boutnaru | |
| 2018/0077195 A1* | 3/2018 | Gathala | H04L 63/1433 |
| 2018/0145969 A1 | 5/2018 | Agrawal et al. | |
| 2018/0145970 A1* | 5/2018 | Agrawal | H04L 63/105 |
| 2018/0181761 A1* | 6/2018 | Sinha | G06F 21/577 |
| 2018/0189147 A1* | 7/2018 | Banasik | G06F 11/2069 |
| 2018/0260542 A1 | 9/2018 | Larvol | |
| 2018/0288070 A1* | 10/2018 | Price | G06F 8/31 |
| 2018/0367561 A1* | 12/2018 | Givental | G06F 21/552 |
| 2018/0375892 A1* | 12/2018 | Ganor | H04L 63/20 |
| 2019/0050595 A1* | 2/2019 | Barday | G06Q 10/107 |
| 2019/0138727 A1* | 5/2019 | Dontov | G06F 11/1464 |
| 2019/0147161 A1* | 5/2019 | Agarwal | G06F 16/27 726/23 |
| 2019/0156042 A1* | 5/2019 | Kim | G06F 16/258 |
| 2019/0179799 A1* | 6/2019 | Barday | H04L 67/568 |
| 2019/0222593 A1* | 7/2019 | Craig | H04L 63/14 |
| 2019/0230098 A1* | 7/2019 | Navarro | G06F 21/577 |
| 2019/0303572 A1* | 10/2019 | Chelarescu | G06F 21/565 |
| 2020/0050770 A1* | 2/2020 | Inagaki | G06F 21/577 |
| 2020/0110885 A1* | 4/2020 | Bellis | G06F 16/9032 |
| 2020/0137125 A1* | 4/2020 | Patnala | H04L 63/205 |
| 2020/0210590 A1* | 7/2020 | Doyle | G06F 8/77 |
| 2020/0228560 A1* | 7/2020 | Murthy | H04L 63/20 |
| 2020/0320215 A1 | 10/2020 | Bhosale et al. | |
| 2020/0342116 A1* | 10/2020 | Agarwal | G06N 20/00 |
| 2021/0034756 A1* | 2/2021 | Vichare | G06F 21/552 |

OTHER PUBLICATIONS

Young et al., "Cryptovirology: The Birth, Neglect, and Explosion of Ransomware," Viewpoints: Communications of the ACM, vol. 60, No. 7, Jul. 2017, pp. 24-26.

Ahmadian et al., "Connection-Monitor & Connection-Breaker: A Novel Approach for Prevention and Detection of High Survivable Ransomwares," IEEE 12th International Iranian Society of Cryptology Conference on Information Security and Cryptology (ISCISC), 2015, pp. 79-84.

Feng et al., "Poster: A New Approach to Detecting Ransomware with Deception," IEEE Symposium on Security and Privacy, 2017, 2 pages, retrieved from https://www.ieee-security.org/TC/SP2017/poster-abstracts/IEEE-SP17_Posters_paper_26.pdf.

Laszka et al., "On the Economics of Ransomware," Springer, Cham, International Conference on Decision and Game Theory for Security, Jul. 2017, 25 pages.

Clarke, R., "Practicable Backup Arrangements for Small Organisations and Individuals," Australasian Journal of Infomnation Systems, vol. 20, 2016, 25 pages.

Kiwia et al., "A cyber kill chain based taxonomy of banking Trojans for evolutionary computational intelligence," Journal of Computational Science, 2017, pp. 1-16.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Wikipedia, "Ransomware," Wikipedia, Feb. 2, 2019, 16 pages, retrieved from https://en.wikipedia.org/wiki/Ransomware.

Non-Final Office Action from U.S. Appl. No. 16/376,960, dated Nov. 5, 2020.

Final Office Action from U.S. Appl. No. 16/376,960, dated Mar. 2, 2021.

Laszka et al., "On the Economics of Ransomware," International Conference on Decision and Game Theory for Security, Jul. 2017, pp. 1-25, retrieved from https://www.researchgate.net/publication/318584080_On_the_Economics_of_Ransomware.

Bhosale et al., U.S. Appl. No. 16/376,960, filed Apr. 5, 2019.

List of IBM Patents Or Patent Applications Treated As Related.

Non-Final Office Action from U.S. Appl. No. 16/376,960, dated Jun. 9, 2021.

Final Office Action from U.S. Appl. No. 16/376,960, dated Nov. 8, 2021.

Notice of Allowance from U.S. Appl. No. 16/376,960, dated Feb. 15, 2022.

\* cited by examiner

PROTECTING DATA BASED ON A SENSITIVITY LEVEL FOR THE DATA

BACKGROUND

The present invention relates to data security, and more specifically, this invention relates to protecting data from malicious activity.

Malware is a constant threat to data security. For example, ransomware is a type of malicious software that threatens to publish the victim's data or perpetually block access to it unless a ransom is paid. While some simple ransomware may lock the system in a way which is not difficult for a knowledgeable person to reverse, more advanced malware uses a technique called cryptoviral extortion, in which it encrypts the victim's files, making them inaccessible, and demands a ransom payment to decrypt them. This is increasingly becoming a major threat to the organizations, as losing access to critical data can lead to significant financial losses and also loss of reputation and credibility in the market for the organization.

However, current methods to address malware such as ransomware exhibit several deficiencies. For example, current anti-malware implementations perform backups of all data in a system without any filtering criteria, and are therefore time and resource-intensive, as well as slow to implement. There is therefore a need to enhance an effectiveness and efficiency of ransomware mitigation.

SUMMARY

A computer-implemented method according to an aspect includes training a cognitive network, utilizing metadata associated with historic data threats, inputting metadata associated with a current data threat into the trained cognitive network, identifying, by the trained cognitive network, one or more stored instances of data determined to be vulnerable to the current data threat, and adjusting one or more security aspects of the one or more stored instances of data determined to be vulnerable to the current data threat.

In this way, data susceptible to a data threat may be cognitively identified and protected in response to the dissemination of information associated with the data threat.

In one aspect, the metadata associated with the current data threat is extracted from one or more news sources, one or more blog posts, and one or more social media posts.

According to one aspect, a computer program product for cognitively securing data based on metadata associated with a data threat includes a computer readable storage medium having program instructions embodied therewith, where the computer readable storage medium is not a transitory signal per se, and where the program instructions are executable by a processor to cause the processor to perform a method including training, by the processor, a cognitive network, utilizing metadata associated with historic data threats, inputting, by the processor, metadata associated with a current data threat into the trained cognitive network, identifying, by the processor and the trained cognitive network, one or more stored instances of data determined to be vulnerable to the current data threat, and adjusting, by the processor, one or more security aspects of the one or more stored instances of data determined to be vulnerable to the current data threat.

According to one aspect, a system includes a processor, and logic integrated with the processor, executable by the processor, or integrated with and executable by the processor, where the logic is configured to train a cognitive network, utilizing metadata associated with historic data threats, input metadata associated with a current data threat into the trained cognitive network, identify, by the trained cognitive network, one or more stored instances of data determined to be vulnerable to the current data threat, and adjust one or more security aspects of the one or more stored instances of data determined to be vulnerable to the current data threat.

According to one aspect, a computer-implemented method includes determining metadata associated with a data threat, comparing the metadata associated with the data threat to metadata associated with a stored instance of data, and conditionally adjusting one or more security aspects of the stored instance of data are conditionally adjusted, based on the comparing.

In one aspect, the one or more security aspects of the stored instance of data are adjusted in response to determining a predetermined amount of matching metadata between the metadata associated with the data threat and the metadata associated with the stored instance of data.

According to one aspect, a computer program product for dynamically securing data based on metadata associated with a data threat includes a computer readable storage medium having program instructions embodied therewith, where the computer readable storage medium is not a transitory signal per se, and where the program instructions are executable by a processor to cause the processor to perform a method including determining, by the processor, metadata associated with a data threat, comparing, by the processor, the metadata associated with the data threat to metadata associated with a stored instance of data, and conditionally adjusting, by the processor, one or more security aspects of the stored instance of data, based on the comparing.

Other aspects and embodiments of the present invention will become apparent from the following detailed description, which, when taken in conjunction with the drawings, illustrate by way of example the principles of the invention.

DETAILED DESCRIPTION

Figure 1:
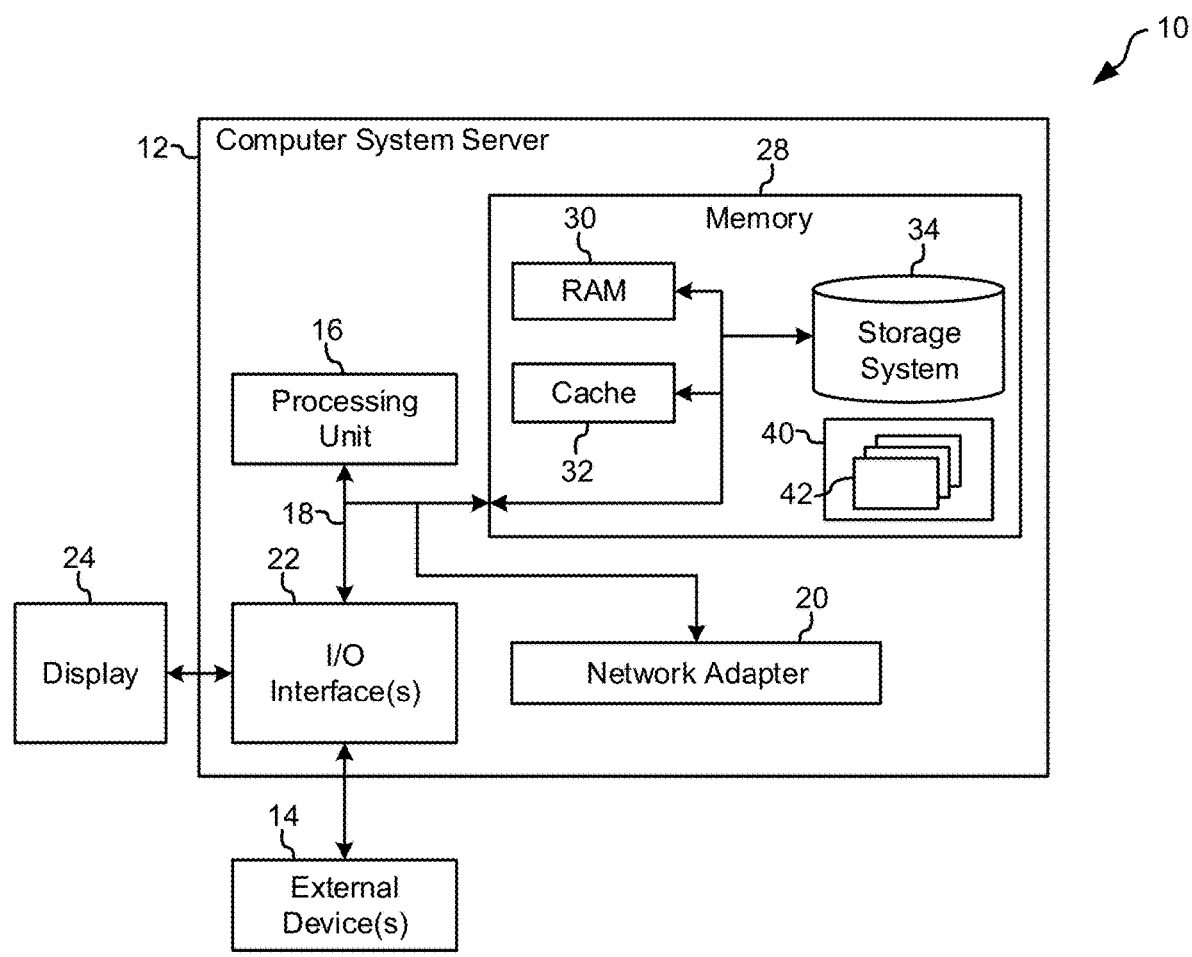
FIG. 1 depicts a cloud computing node according to an aspect of the present invention.

The following description discloses several preferred aspects of systems, methods and computer program products for protecting data based on a sensitivity level for the data. Various aspects provide a method for determining a sensitivity level for data, and conditionally backing up the data or changing data permissions for the data based on a comparison of the sensitivity level to one or more policies.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for protecting data based on a sensitivity level for the data.

In one aspect, a computer-implemented method includes training a cognitive network, utilizing metadata associated with historic data threats, inputting metadata associated with a current data threat into the trained cognitive network, identifying, by the trained cognitive network, one or more stored instances of data determined to be vulnerable to the current data threat, and adjusting one or more security aspects of the one or more stored instances of data determined to be vulnerable to the current data threat.

In this way, data susceptible to a data threat may be cognitively identified and protected in response to the dissemination of information associated with the data threat.

In one aspect, the metadata associated with the current data threat is extracted from one or more news sources, one or more blog posts, and one or more social media posts.

In another aspect, a computer program product for cognitively securing data based on metadata associated with a data threat includes a computer readable storage medium having program instructions embodied therewith, where the computer readable storage medium is not a transitory signal per se, and where the program instructions are executable by a processor to cause the processor to perform a method including training, by the processor, a cognitive network, utilizing metadata associated with historic data threats, inputting, by the processor, metadata associated with a current data threat into the trained cognitive network, identifying, by the processor and the trained cognitive network, one or more stored instances of data determined to be vulnerable to the current data threat, and adjusting, by the processor, one or more security aspects of the one or more stored instances of data determined to be vulnerable to the current data threat.

In one aspect, a system includes a processor, and logic integrated with the processor, executable by the processor, or integrated with and executable by the processor, where the logic is configured to train a cognitive network, utilizing metadata associated with historic data threats, input metadata associated with a current data threat into the trained cognitive network, identify, by the trained cognitive network, one or more stored instances of data determined to be vulnerable to the current data threat, and adjust one or more security aspects of the one or more stored instances of data determined to be vulnerable to the current data threat.

In one aspect, a computer-implemented method includes determining metadata associated with a data threat, comparing the metadata associated with the data threat to metadata associated with a stored instance of data, and conditionally adjusting one or more security aspects of the stored instance of data are conditionally adjusted, based on the comparing.

In one aspect, the one or more security aspects of the stored instance of data are adjusted in response to determining a predetermined amount of matching metadata between the metadata associated with the data threat and the metadata associated with the stored instance of data.

In one aspect, a computer program product for dynamically securing data based on metadata associated with a data threat includes a computer readable storage medium having program instructions embodied therewith, where the computer readable storage medium is not a transitory signal per se, and where the program instructions are executable by a processor to cause the processor to perform a method including determining, by the processor, metadata associated with a data threat, comparing, by the processor, the metadata associated with the data threat to metadata associated with a stored instance of data, and conditionally adjusting, by the processor, one or more security aspects of the stored instance of data, based on the comparing.

It is understood in advance that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of aspects of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of aspects of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of aspects of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
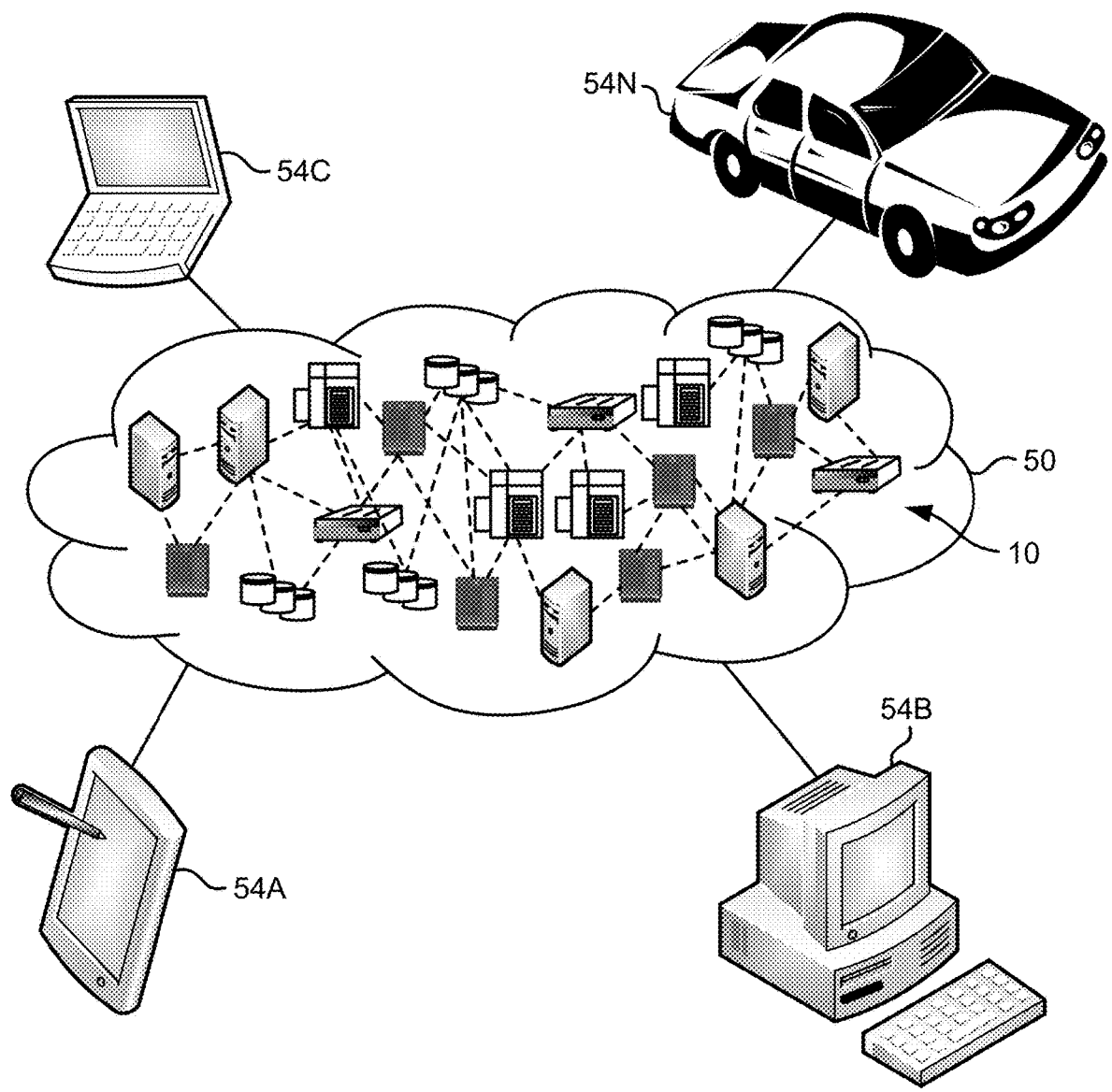
FIG. 2 depicts a cloud computing environment according to an aspect of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
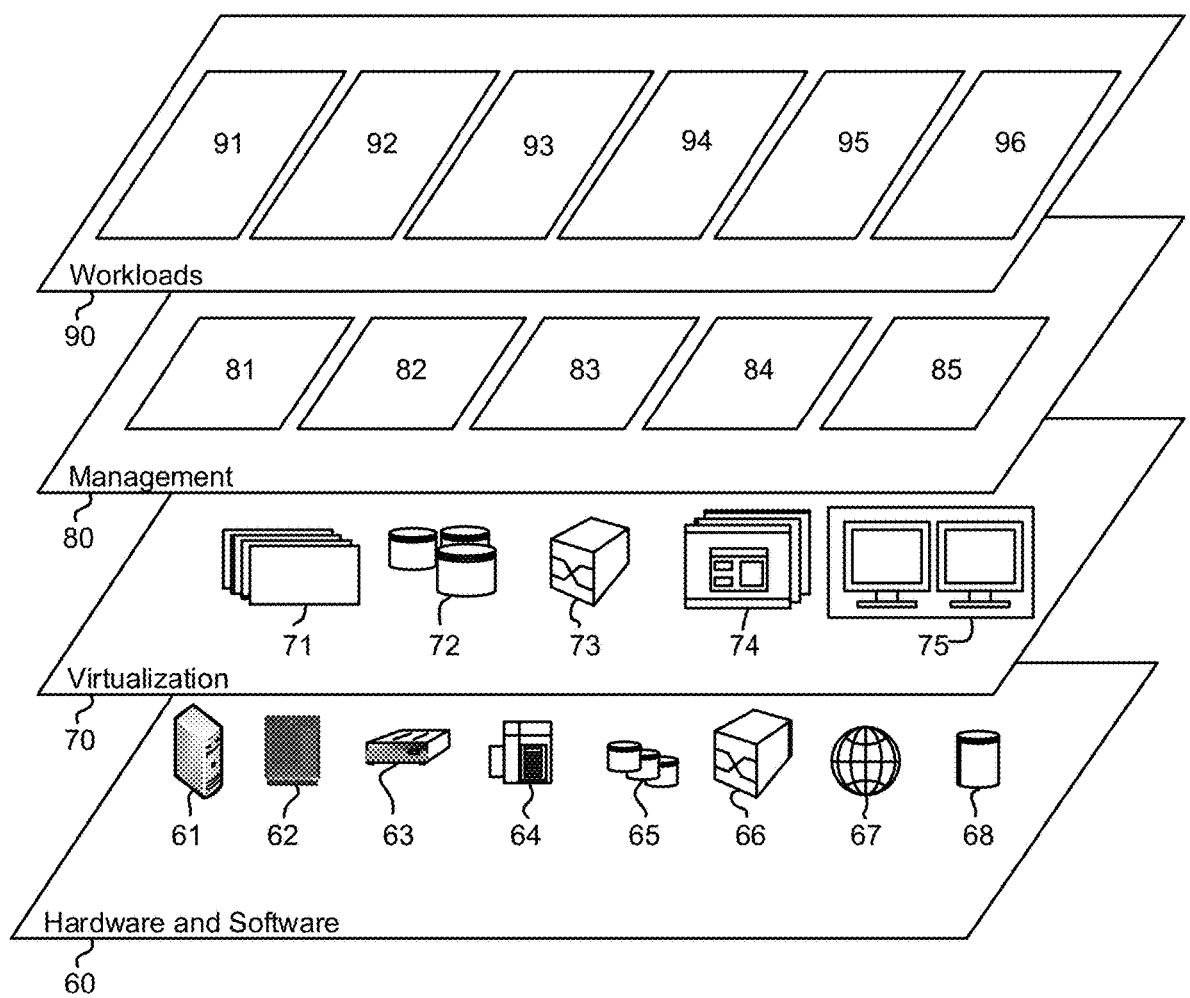
FIG. 3 depicts abstraction model layers according to an aspect of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data analysis and protection 96.

Figure 4:
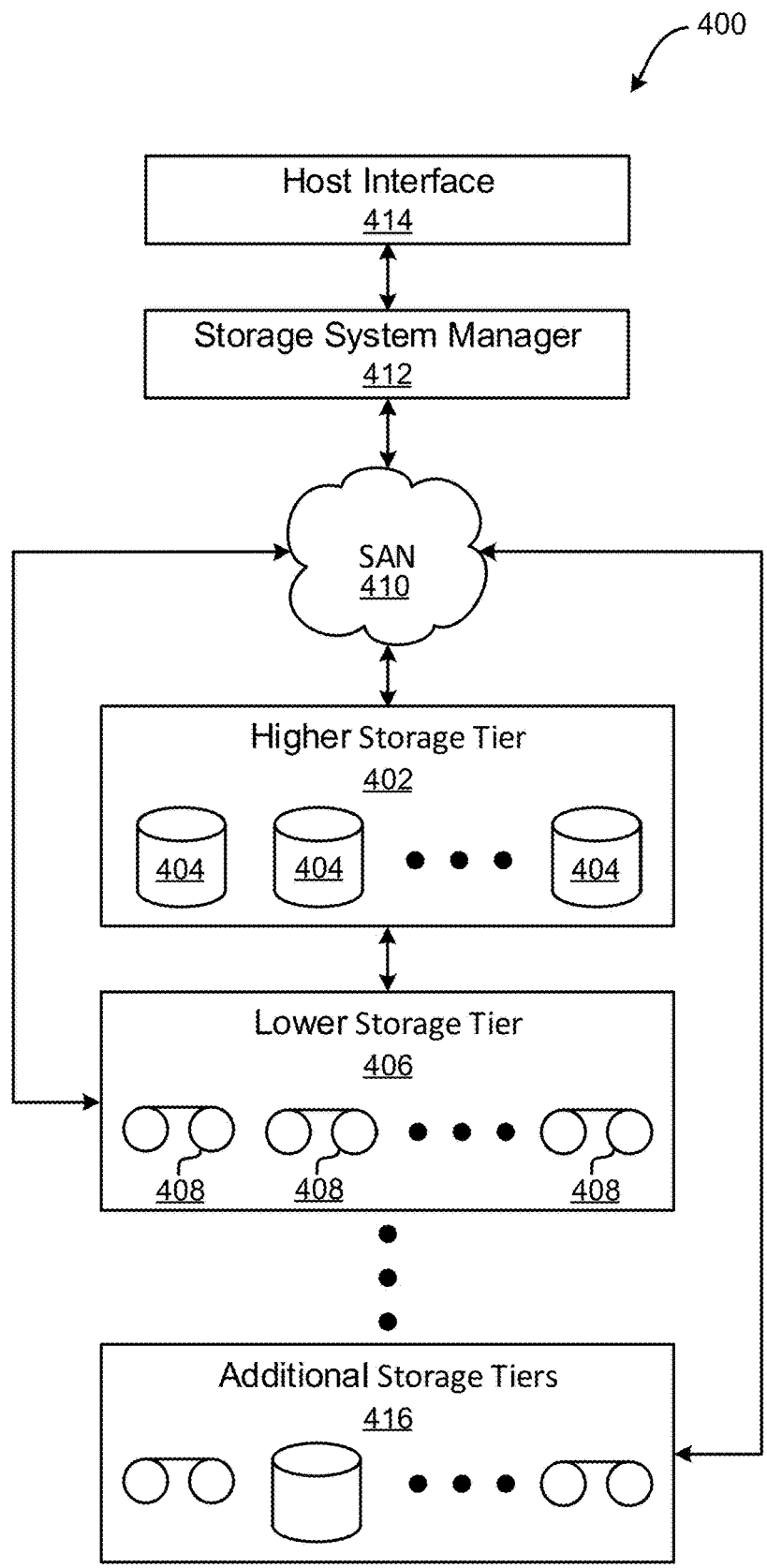
FIG. 4 illustrates a tiered data storage system in accordance with one aspect.

Now referring to FIG. 4, a storage system 400 is shown according to one aspect. Note that some of the elements shown in FIG. 4 may be implemented as hardware and/or software, according to various aspects. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the aspects presented herein.

According to some aspects, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various aspects.

Figure 5:
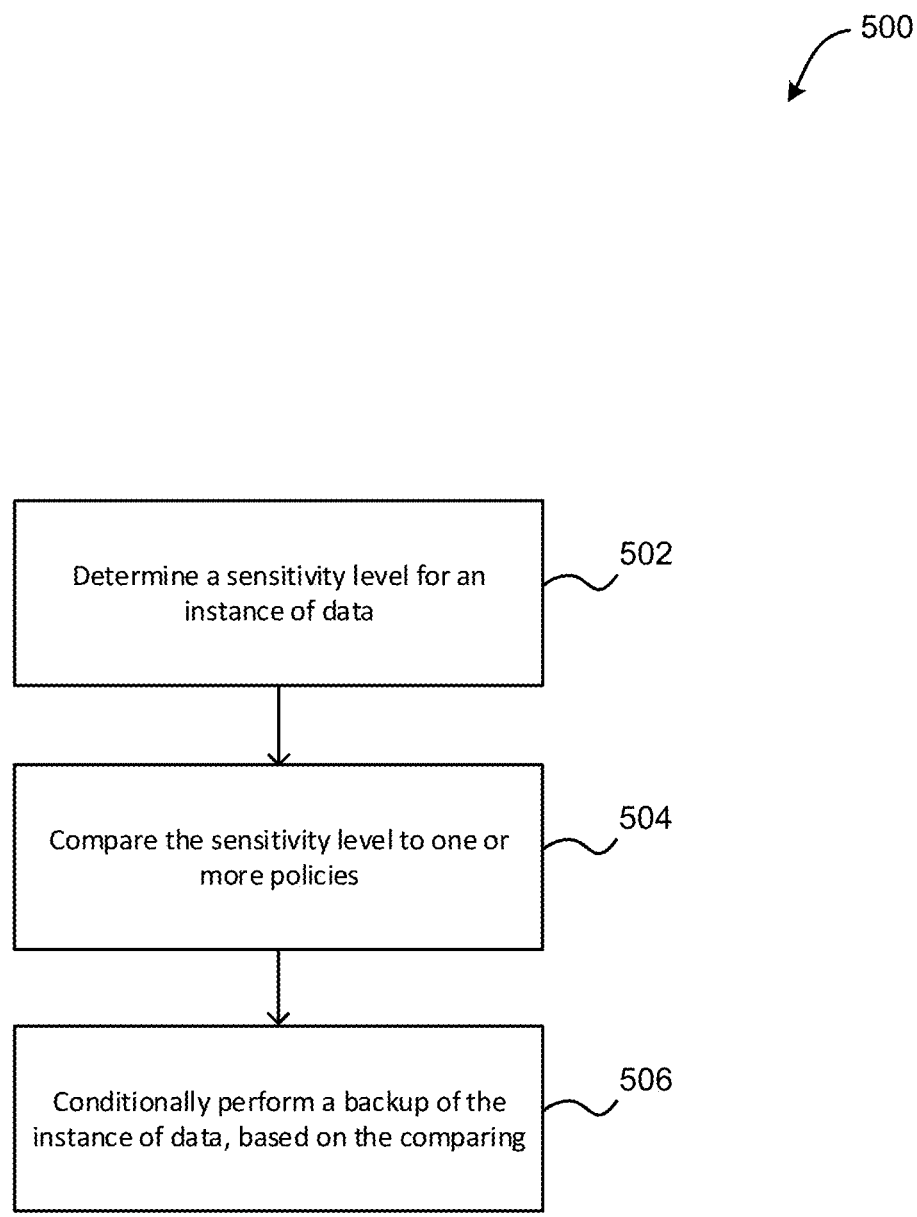
FIG. 5 illustrates a flowchart of a method for protecting data based on a sensitivity level for the data, in accordance with one aspect.

Now referring to FIG. 5, a flowchart of a method 500 is shown according to one aspect. The method 500 may be performed in accordance with the present invention in any of the environments depicted in FIGS. 1-4 and 9-10, among others, in various aspects. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a sensitivity level is determined for an instance of data. In one aspect, the instance of data may include a file, an object, etc. For example, the instance of data may include textual data, video data, image data, audio data, etc. In another aspect, the sensitivity level may be determined for the instance of data in response to the creation or modification (e.g., editing, etc.) of the instance of data.

For example, data access may be monitored within a system, and the creation or modification of the instance of data may be identified as a result of the monitoring. In another example, the instance of data may be created or modified within a computing system such as a single computing device, a clustered computing system, a cloud-based computing environment, etc.

Additionally, in one aspect, the sensitivity level for the instance of data may be determined utilizing metadata associated with the instance of data. For example, metadata may be stored with the instance of data during the creation or modification of the instance of data. In another example, the metadata may include one or more of a name of the instance of data, an owner of the instance of data, a file size of the instance of data, a platform in which the instance of data is utilized, a last update time for the instance of data, a time of creation of the instance of data, a heat value for the data, etc. In yet another example, all or a portion of the metadata may be user-defined.

Further, in one aspect, the sensitivity level for the instance of data may be determined by analyzing the instance of data. For example, the analysis of the instance of data may include one or more of parsing text within the instance of data, performing image analysis within the instance of data, performing optical character recognition (OCR) for the instance of data, converting the instance of data to another format (e.g., from a PDF to text, etc.), comparing the instance of data to another instance of data, identifying one or more objects within the instance of data, etc. In another example, the analysis of the instance of data may result in additional metadata for the instance of data. For instance, the additional metadata may include one or more topics associated with the instance of data, one or more keywords found within the instance of data, one or more objects identified within the instance of data, etc.

Further still, in one aspect, the sensitivity level for the instance of data may be determined utilizing the metadata associated with the instance of data, as well as the additional metadata determined for the instance of data resulting from the analysis of the instance of data. For example, the metadata associated with the instance of data, as well as the additional metadata determined for the instance of data resulting from the analysis of the instance of data, may be compared to predetermined metadata.

Also, in one example, the sensitivity level may be determined for the instance of data based on a predetermined number of matches between the predetermined metadata and the metadata associated with the instance of data, as well as the additional metadata determined for the instance of data resulting from the analysis of the instance of data. For instance, a first number of matching metadata may result in a first sensitivity level. In another instance, a second number of matching metadata greater than the first number may result in a second sensitivity level greater than the first sensitivity level.

In addition, in one aspect, a weight and/or value may be assigned to the instance of data for each instance of metadata associated with the instance of data (e.g., the metadata associated with the instance of data, as well as the additional metadata determined for the instance of data resulting from the analysis of the instance of data). In another aspect, the assigned weights and/or values may be summed for the instance of data, and a predetermined sensitivity level corresponding to the summed weight and/or value may be determined.

Furthermore, in one aspect, the sensitivity level for the instance of data may indicate a malware sensitivity of the instance of data, and may be indicate a risk of the instance of data being susceptible to one or more instances of malware (e.g., ransomware, etc.). For example, a predetermined malware threat may be associated with predetermined threat metadata. In another example, if the metadata associated with the instance of data, as well as the additional metadata determined for the instance of data resulting from the analysis of the instance of data matches all or a predetermined percentage of the predetermined threat metadata, the instance of data may be determined to be susceptible to the predetermined malware threat, and may be assigned a predetermined sensitivity level.

Further still, in one aspect, the sensitivity level may include an integer value or any other numerical or textual value. For example, the sensitivity level may include a level within a predetermined scale (e.g., integers from one to ten, etc.). In another aspect, the sensitivity level may be stored in association with the instance of data (e.g., within a database, etc.).

Also, in one aspect, the sensitivity level may be determined for the instance of data in response to the creation or modification of the instance of data. In another aspect, the instance of data may be added to a queue in response to the creation or modification of the instance of data, and the sensitivity level may be determined for the instance of data in response to retrieval of the instance of data from the queue.

Additionally, method 500 may proceed with operation 504, where the sensitivity level is compared to one or more policies. In one aspect, each of the one or more policies may be predetermined. In another aspect, each of the one or more policies may indicate a schedule by which data is to be backed up, as well as a corresponding sensitivity level for the data and/or a backup location for the data.

For example, a policy may indicate that data having a first sensitivity level is to be backed up according to a first frequency, data having a second sensitivity level is to be backed up according to a second frequency different from the first frequency, etc. In another example, the frequency by which the data is backed up may include an associated timeline (e.g., hourly, daily, weekly, etc.). In yet another example, a policy may indicate that data having a predetermined sensitivity level is to be immediately backed up. In still another example, a policy may indicate that data having a first sensitivity level is to be backed up to a first location, data having a second sensitivity level is to be backed up according to a second location different from the first location, etc.

Further, in one aspect, the one or more policies may be stored (e.g., in a database, etc.). In another aspect, the sensitivity level may be compared to the one or more policies in response to the creation or modification of the instance of data. In yet another aspect, the instance of data may be added to a queue in response to the creation or modification of the instance of data, and the sensitivity level may be compared to the one or more policies after the sensitivity level is determined in response to retrieval of the instance of data from the queue.

Further still, in one aspect, the sensitivity level may be stored in a local database with the instance of data (or a pointer to a storage location of the instance of data), and the sensitivity level may be retrieved from the local database and compared to the one or more policies according to a predetermined schedule (e.g., where comparisons are performed periodically, etc.). In another aspect, results of the comparing may include an indication as to whether the instance of data is to be backed up, as well as a time and/or date that the instance of data is to be backed up and/or a frequency by which the instance of data is to be backed up (e.g., according to a schedule indicated by one or more policies, etc.).

Also, method 500 may proceed with operation 506, where a backup of the instance of data is conditionally performed, based on the comparing. In one aspect, results of the comparing may indicate that the instance of data is to be immediately backed up. For example, the instance of data may then be immediately backed up in response to the indication.

In addition, in one aspect, results of the comparing may indicate that the instance of data is to be backed up according to a predetermined schedule. For example, the instance of data may then be flagged as being associated with the predetermined schedule. In another example, a backup application may be notified when the predetermined schedule indicates that a backup of associated data is to be performed. In yet another example, in response to the notification, all data flagged as being associated with the predetermined schedule may be identified and may be backed up.

Furthermore, in one aspect, results of the comparing may also indicate a location where the instance of data is to be backed up. For example, the instance of data may be backed up to the indicated location. In another aspect, performing the backup of the instance of data may include sending a copy of the instance of data to a storage area for storage.

For example, the storage area may include a storage area within the system where the instance of data was created. In another example, the storage area may include a storage area separate from the system where the instance of data was created. In yet another example, the storage area may include one or more databases. In still another example, the storage area may include cloud-based storage, tape storage, disk storage, flash storage, etc. In another aspect, the instance of data may be automatically backed up in response to a determination that the sensitivity level is above a predetermined threshold.

In this way, data determined to be susceptible to a malware attack may be preemptively backed up to a separate data storage location. This may minimize an impact of a malware attack involving the data, which may improve a functioning of computer devices that store and utilize the data. Additionally, instead of backing up all data at an equal rate, data having a higher level of sensitivity may be backed up at a higher frequency when compared to data having a lower level of sensitivity. This may increase an efficiency of backups being performed, and may reduce a utilization of resources (e.g., data bandwidth, processor utilization, etc.) during the performance of backups.

Further, by optimizing backup frequencies for data based on sensitivity level for the data, an amount of data stored during backups may be reduced. This may optimize storage usage during the backup process.

Figure 6:
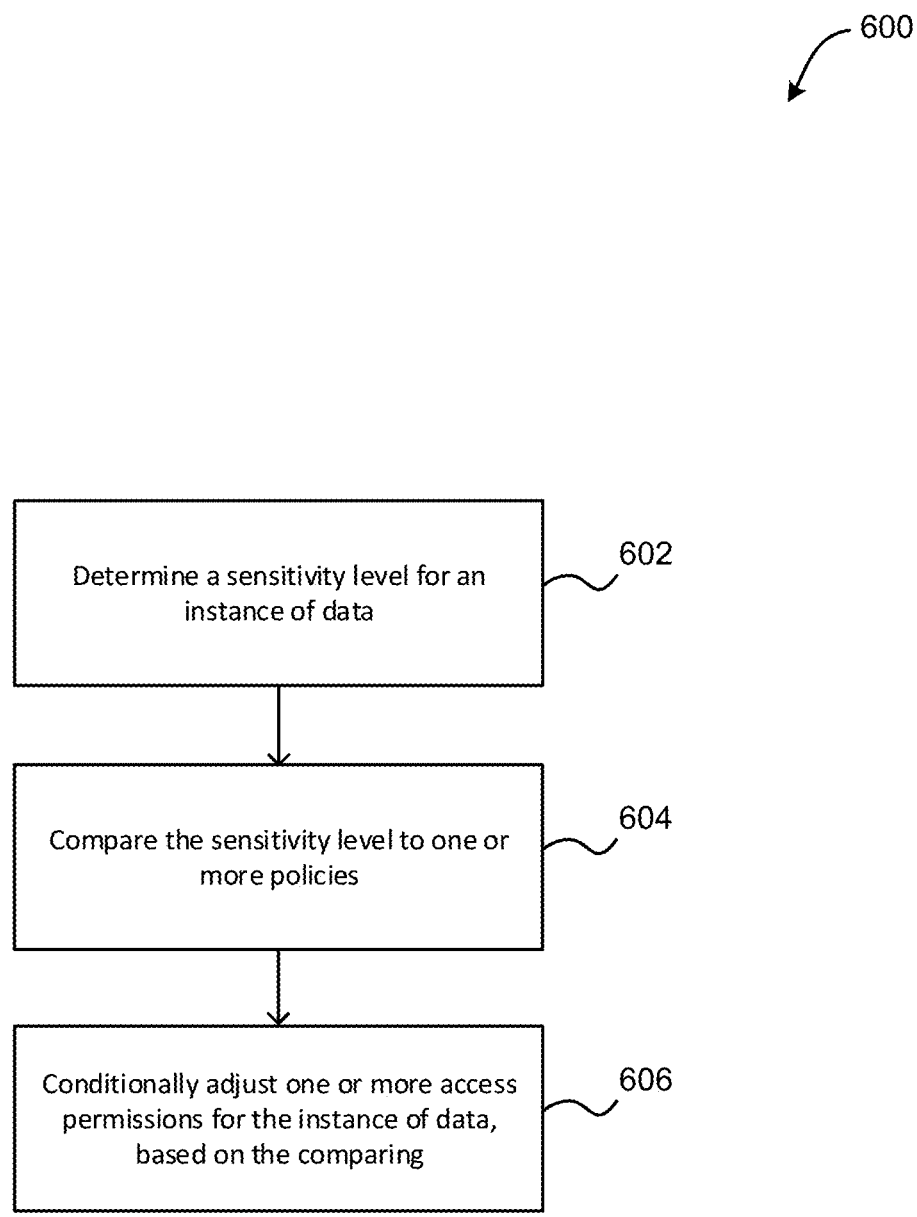
FIG. 6 illustrates a flowchart of a method for adjusting access permissions for data based on a sensitivity level for the data, in accordance with one aspect.

Now referring to FIG. 6, a flowchart of a method 600 for adjusting access permissions for data based on a sensitivity level for the data is shown according to one aspect. The method 600 may be performed in accordance with the present invention in any of the environments depicted in FIGS. 1-4 and 9-10, among others, in various aspects. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a sensitivity level is determined for an instance of data. In one aspect, the sensitivity level may be determined for the instance of data in a manner similar to that described in operation 502 of FIG. 5.

Additionally, method 600 may proceed with operation 604, where the sensitivity level is compared to one or more policies. In one aspect, each of the one or more policies may be predetermined. In another aspect, each of the one or more policies may indicate access permissions to be set for the instance of data, as well as a corresponding sensitivity level for the data. For example, a policy may indicate that a first set of access permissions are to be set for data having a first sensitivity level, a second set of access permissions different for the first set of access permissions are to be set for data having a second sensitivity level, etc. In another example, the access permissions may include one or more of password protection, data encryption, required access credentials, etc.

Further, in one aspect, the one or more policies may be stored (e.g., in a database, etc.). In another aspect, the sensitivity level may be compared to the one or more policies in response to the creation or modification of the instance of data. In yet another aspect, the instance of data may be added to a queue in response to the creation or modification of the instance of data, and the sensitivity level may be compared to the one or more policies after the sensitivity level is determined in response to retrieval of the instance of data from the queue. In still another aspect, results of the comparing may include an indication as to the access permissions to be set for the instance of data.

Further still, method 600 may proceed with operation 606, where one or more access permissions for the instance of data are conditionally adjusted, based on the comparing. In one aspect, results of the comparing may indicate that predetermined access permissions are to be set for the instance of data. In another aspect, the predetermined access permissions may be set for the instance of data in response to the indication.

In this way, secure access permissions may be set for data determined to be susceptible to a malware attack. This may minimize an impact of a malware attack involving the data, which may improve a functioning of computer devices that store and utilize the data. Additionally, instead of updating access permissions for all stored data, only data having a higher level of sensitivity may have updated access permissions. This may increase an efficiency of access permission updating, and may reduce a utilization of resources (e.g., processor utilization, etc.) during the performance of access permission updating.

Figure 7:
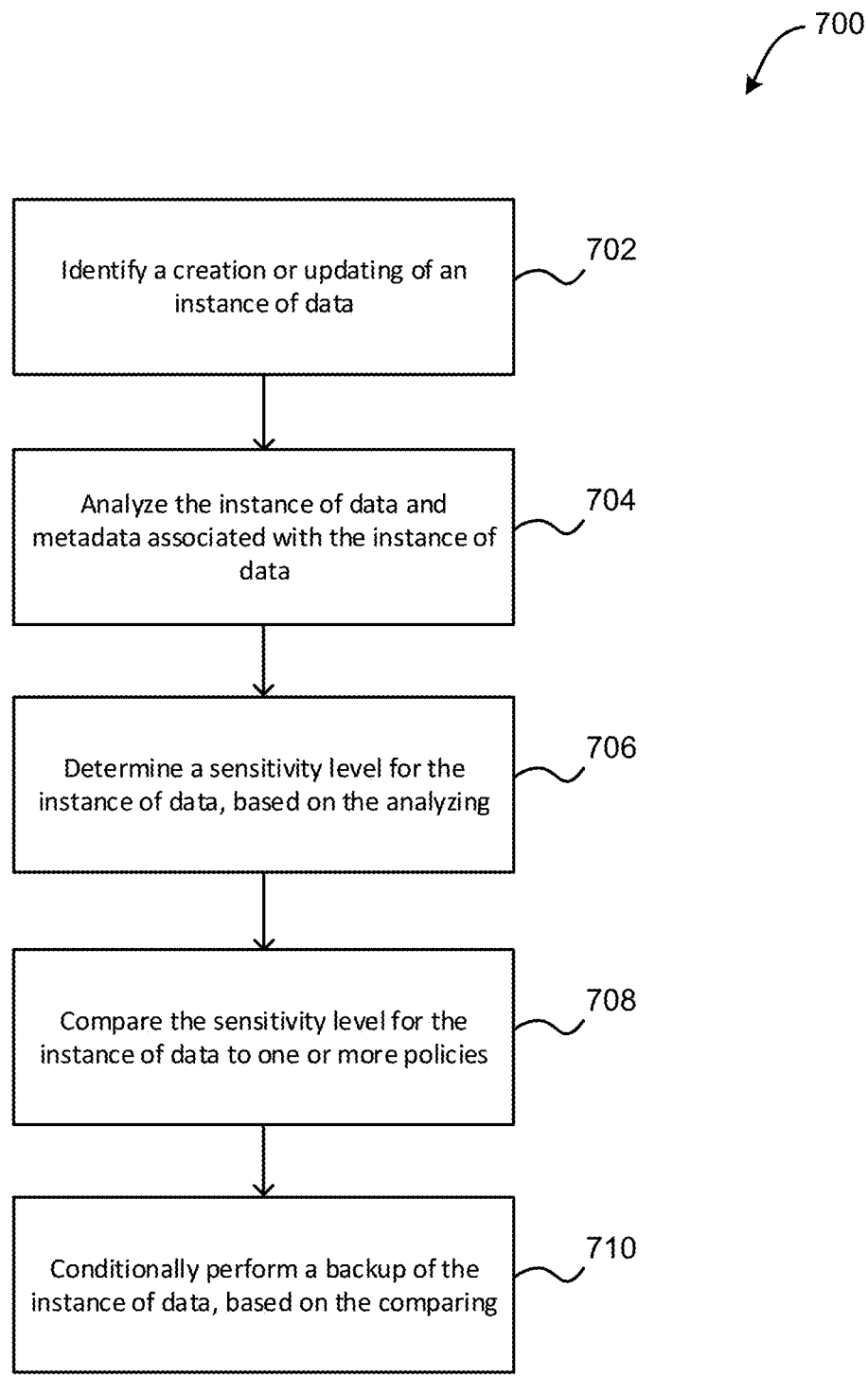
FIG. 7 illustrates a flowchart of a method for conditionally backing up data based on a sensitivity level for the data, in accordance with one aspect.

Now referring to FIG. 7, a flowchart of a method 700 for conditionally backing up data based on a sensitivity level for the data is shown according to one aspect. The method 700 may be performed in accordance with the present invention in any of the environments depicted in FIGS. 1-4 and 9-10, among others, in various aspects. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a creation or updating of an instance of data is identified. In one aspect, monitoring may be performed within a system, and the creation or updating of the instance of data may be identified in response to the monitoring.

Additionally, method 700 may proceed with operation 704, where the instance of data and metadata associated with the instance of data are analyzed. In one aspect, the metadata associated with the instance of data may be stored with the instance of data during the creation or modification of the instance of data. In another aspect, the analysis of the instance of data may include one or more of parsing text within the instance of data, performing image analysis within the instance of data, performing optical character recognition (OCR) for the instance of data, converting the instance of data to another format (e.g., from a PDF to text, etc.), comparing the instance of data to another instance of data, identifying one or more objects within the instance of data, etc. In yet another aspect, the analysis of the instance of data may result in additional metadata for the instance of data.

Further, method 700 may proceed with operation 706, where a sensitivity level is determined for the instance of data, based on the analyzing. In one aspect, the sensitivity level may be determined for the instance of data in a manner similar to that described in operation 502 of FIG. 5.

Further still, method 700 may proceed with operation 708, where the sensitivity level for the instance of data is compared to one or more policies. In one aspect, the comparing may be performed periodically (e.g., according to a schedule, etc.). For example, the sensitivity level for the instance of data may be stored in association with the instance of data. In another example, periodically, each stored sensitivity level may be compared to the one or more policies.

Also, in one aspect, the comparing may be performed in response to the creation or updating of the instance of data. For example, the comparing may be performed immediately after the sensitivity level is determined. In another example, the sensitivity level may not be stored in association with the instance of data (e.g., at a local storage area such as a database, etc.). In yet another example, the sensitivity level be stored in association with the instance of data when the instance of data is backed up. For instance, the sensitivity level may be stored with the instance of data at the backup location.

In addition, method 700 may proceed with operation 710, where a backup of the instance of data is conditionally performed, based on the comparing. In one aspect, the backup of the instance of data may be conditionally performed in a manner similar to that described in operation 506 of FIG. 5.

Figure 8:
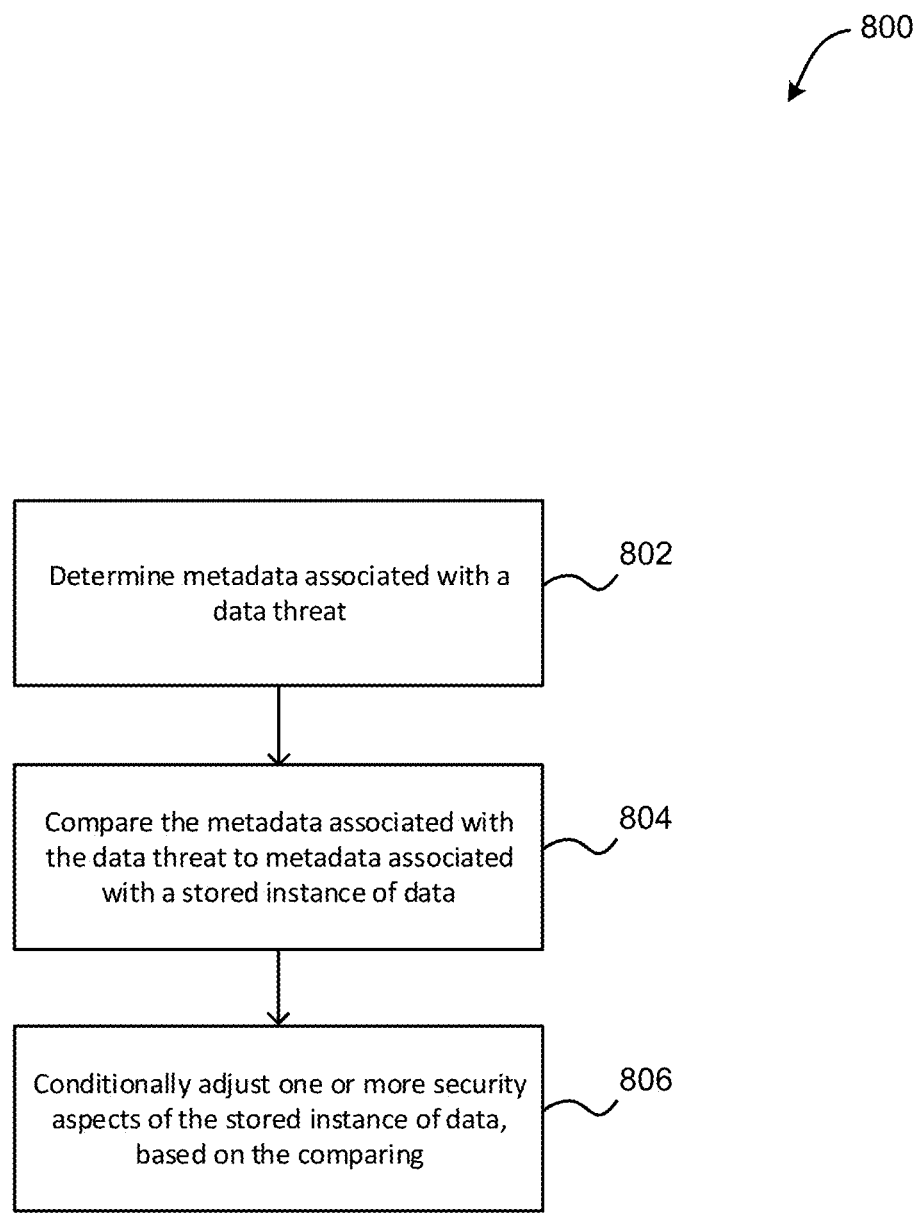
FIG. 8 illustrates a flowchart of a method for dynamically securing data based on metadata associated with a data threat, in accordance with one aspect.

Now referring to FIG. 8, a flowchart of a method 800 for dynamically securing data based on metadata associated with a data threat is shown according to one aspect. The method 800 may be performed in accordance with the present invention in any of the environments depicted in FIGS. 1-4 and 9-10, among others, in various aspects. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various aspects, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where metadata associated with a data threat is determined. In one aspect, the metadata associated with the data threat may be extracted from one or more data sources. In another aspect, the one or more data sources may include one or more news sources, one or more blog posts, one or more social media posts, etc. In yet another aspect, the one or more data sources may be parsed in order to identify the metadata associated with the data threat.

For example, one or more articles, links, or other textual, audio, and/or visual data provided by the one or more data sources may be parsed and/or analyzed in order to determine the metadata associated with the data threat. In another aspect, the metadata associated with the data threat may include an identification of the data threat, one or more types of data susceptible to and/or negatively affected by the data threat, one or more locations where the data threat has occurred, etc. In yet another aspect, the data threat may include one or more instance of malware (e.g., a malware attack, etc.).

Additionally, method 800 may proceed with operation 804, where the metadata associated with the data threat is compared to metadata associated with a stored instance of data. In one aspect, the metadata associated with the stored instance of data may include metadata stored with the instance of data during the creation or modification of the instance of data. For example, the metadata associated with the stored instance of data may include one or more of a name of the instance of data, an owner of the instance of data, a file size of the instance of data, a platform in which the instance of data is utilized, a last update time for the instance of data, etc.

Further, in one aspect, the metadata associated with the stored instance of data may include additional metadata determined by analyzing the instance of data. For example, the analysis of the instance of data may include one or more of parsing text within the instance of data, performing image analysis within the instance of data, performing optical character recognition (OCR) for the instance of data, converting the instance of data to another format (e.g., from a PDF to text, etc.), comparing the instance of data to another instance of data, identifying one or more objects within the instance of data, etc. In another example, the additional metadata may include one or more topics associated with the instance of data, one or more keywords found within the instance of data, one or more objects identified within the instance of data, etc.

Further still, in one aspect, the metadata associated with the data threat may be compared to the metadata associated with the stored instance of data in order to determine whether the stored instance of data is susceptible to the data threat.

Also, method 800 may proceed with operation 806, where one or more security aspects of the stored instance of data are conditionally adjusted, based on the comparing. In one aspect, one or more security aspects of the stored instance of data may be adjusted in response to determining a predetermined amount of matching metadata between the metadata associated with the data threat and the metadata associated with the stored instance of data. In another aspect, one or more security aspects of the stored instance of data may be adjusted in response to determining that the metadata associated with the data threat is associated with the metadata associated with the stored instance of data.

Additionally, in one aspect, one or more security aspects of the stored instance of data may be adjusted in response to determining that the stored instance of data is susceptible to the data threat, based on the comparing. In another aspect, conditionally adjusting the one or more security aspects may include changing a sensitivity level for the stored instance of data. In yet another aspect, conditionally adjusting the one or more security aspects may include immediately backing up the stored instance of data. In still another aspect, conditionally adjusting the one or more security aspects may include adjusting one or more data permissions for the stored instance of data.

In this way, data susceptible to a data threat may be identified and protected in response to the dissemination of information associated with the data threat.

Figure 9:
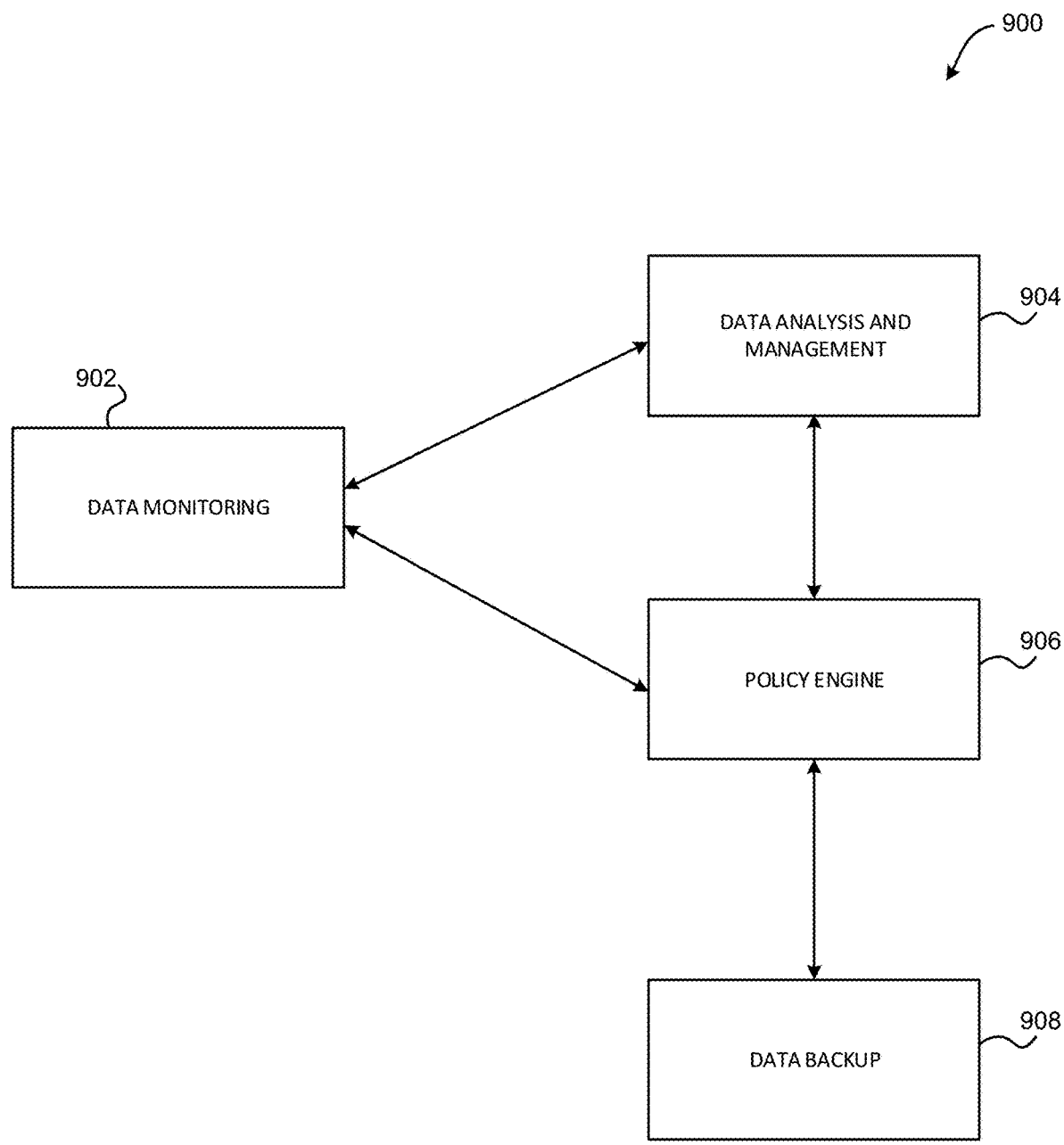
FIG. 9 illustrates an exemplary policy-based sensitive data backup environment, in accordance with one aspect.

FIG. 9 illustrates an exemplary policy-based sensitive data backup environment 900, according to one exemplary aspect. In one aspect, the environment 900 may be implemented within a single system, within one or more nodes of a multi-node cluster, a cloud computing environment, etc.

Additionally, in one aspect, a data monitoring module 902 identifies the creation or modification of an instance of data. For example, the data monitoring module 902 may monitor actions performed on data, and may identify the creation or modification of the instance of data as a result of such monitoring. In another aspect, the identified creation or modification of the instance of data may be sent as an event from the data monitoring module 902 to a data analysis and management module 904. In yet another aspect, metadata associated with the instance of data (e.g., name, owner, file size, etc.) may also be sent from the data monitoring module 902 to a data analysis and management module 904.

Further, in one aspect, the data analysis and management module 904 may store the event and any associated metadata received from the data monitoring module 902. For example, the data analysis and management module 904 may store the event and metadata in a key value store of the data analysis and management module 904. In another aspect, the data analysis and management module 904 may analyze the instance of data to determine additional metadata (e.g., topics, keywords, etc.) for the instance of data. In one aspect, this analysis may be performed utilizing one or more neural networks.

Further still, in one aspect, the data analysis and management module 904 may determine a sensitivity level for the instance of data, based at least in part on the associated metadata and the additional metadata. The data analysis and management module 904 may then store the sensitivity level for the instance of data with the instance of data (e.g., as sensitivity metadata, etc.).

Also, in one aspect, a policy engine 906 may retrieve the sensitivity level for the instance of data from the data analysis and management module 904, and may compare the retrieved sensitivity level to one or more data backup policies. In one aspect, the policy engine 906 may retrieve and compare a plurality of sensitivity levels according to a predetermined schedule. In another aspect, the policy engine 906 may retrieve and compare the sensitivity level in response to receiving an identification of the creation or modification of the instance of data from the data monitoring module 902.

In addition, in one aspect, results of comparing the retrieved sensitivity level to one or more data backup policies may include data backup information for the instance of data (e.g., an indication as to whether the instance of data is to be backed up, as well as a time and/or date that the instance of data is to be backed up and/or a frequency by which the instance of data is to be backed up, etc.). This data backup information may be sent from the policy engine 906 to a data backup module 908. The data backup module 908 may then back up the instance of data according to the received data backup information.

Furthermore, in one aspect, the policy engine 906 may receive an immediate notification from the data analysis and management module 904 in response to a determination by the data analysis and management module 904 that the instance of data has a sensitivity level above a predetermined threshold.

Figure 10:
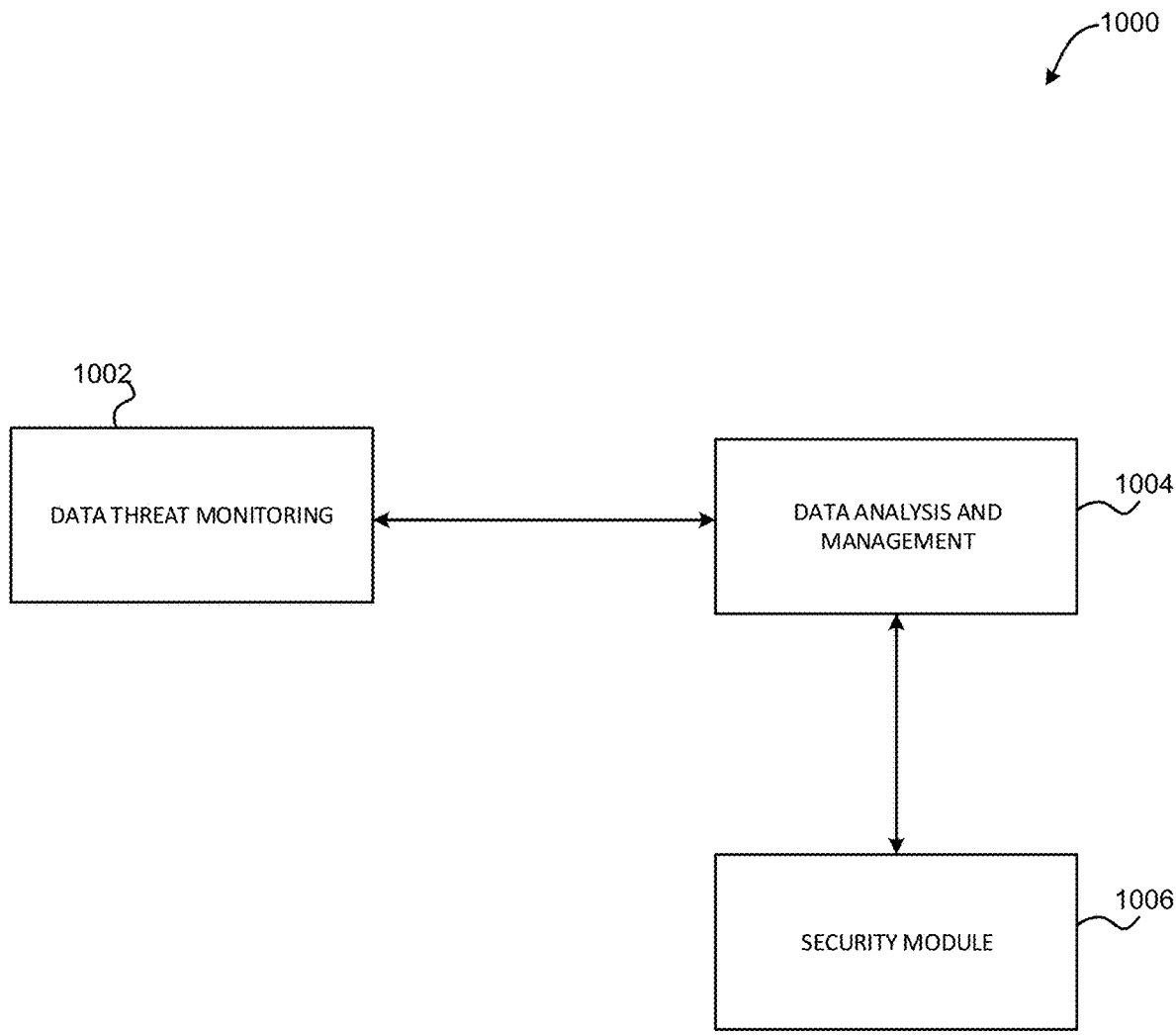
FIG. 10 illustrates an exemplary threat-responsive data backup environment, in accordance with one aspect.

FIG. 10 illustrates an exemplary threat-responsive data backup environment 1000, according to one exemplary aspect. In one aspect, the environment 1000 may be implemented within a single system, within one or more nodes of a multi-node cluster, a cloud computing environment, etc.

Additionally, in one aspect, a data threat monitoring module 1002 monitors one or more data sources. In another aspect, as a result of the monitoring, the data threat monitoring module 1002 identifies an existing data threat, and extracts threat metadata associated with the threat. In yet another aspect, the data threat monitoring module 1002 sends the threat metadata to a data analysis and management module 1004.

Further, in one aspect, the data analysis and management module 1004 compares the threat metadata to stored metadata associated with a stored instance of data. The comparison may be performed in a manner similar to that described in operation 804 of FIG. 8. In response to determining that the stored instance of data is susceptible to the data threat, an identification of the instance of data is sent from the data analysis and management module 1004 to a security module 1006.

Further still, in one aspect, the data analysis and management module 1004 may update a sensitivity level for the instance of data, in response to determining that the stored instance of data is susceptible to the data threat. In another aspect, the update sensitivity level and/or an indication of one or more security actions (e.g., backing up the instance of data, changing data permissions for the instance of data, etc.) may be sent from the data analysis and management module 1004 to the security module 1006 with the identification of the instance of data.

Further still, in one aspect, the security module 1006 may implement one or more security actions for the instance of data. For example, the security module 1006 may implement one or more security actions received from the data analysis and management module 1004. In another aspect, the security module may compare the sensitivity level for the instance of data to one or more thresholds, and may perform one or more security actions in response to determining that the sensitivity level for the instance of data exceeds one or more thresholds. In yet another aspect, the security module 1006 may automatically implement one or more security actions in response to receiving the identification of the instance of data from the data analysis and management module 1004.

Figure 11:
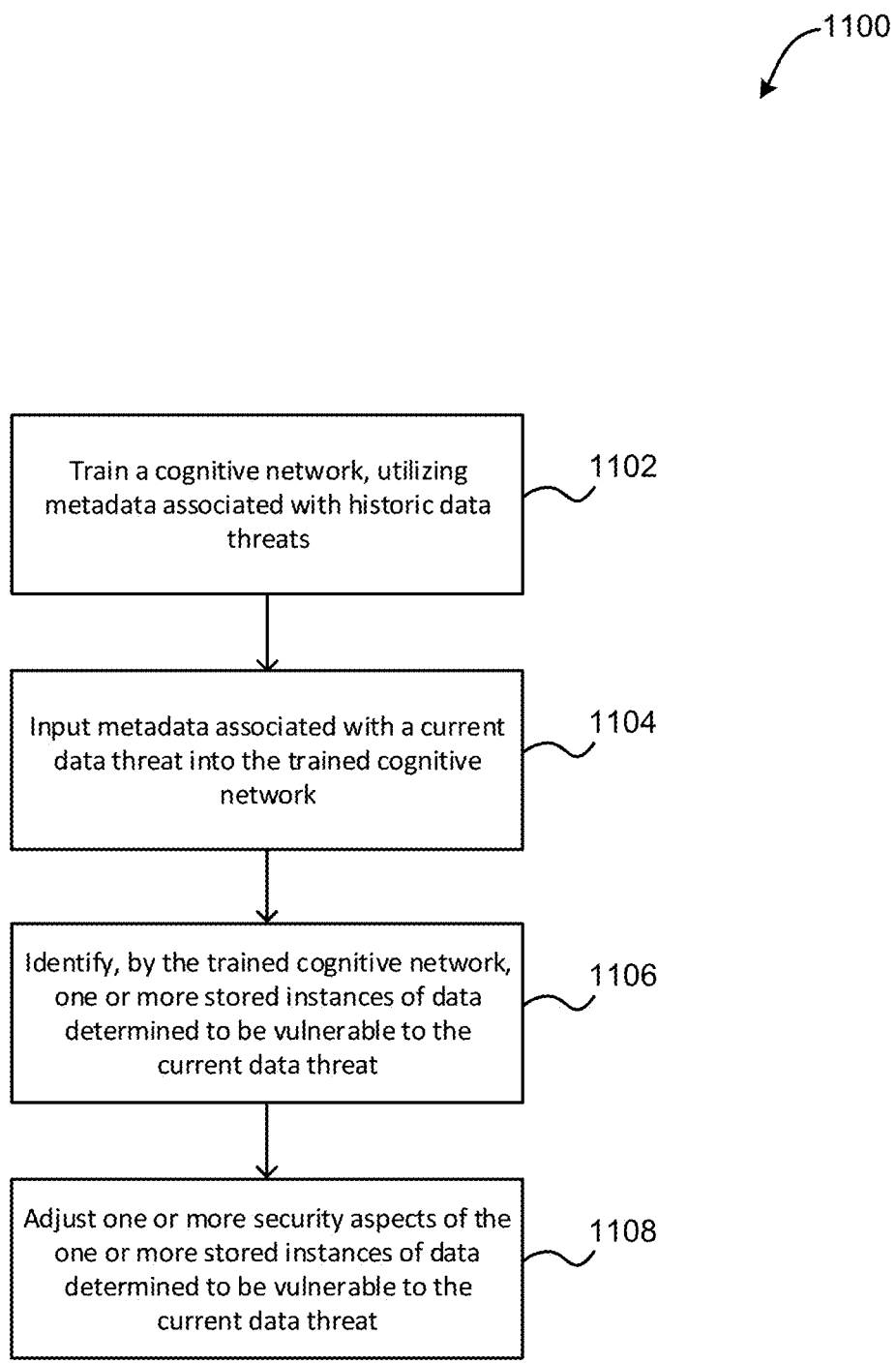
FIG. 11 illustrates a flowchart of a method for cognitively securing data based on metadata associated with a data threat, in accordance with one aspect.

Now referring to FIG. 11, a flowchart of a method 1100 for cognitively securing data based on metadata associated with a data threat is shown according to one aspect. The method 1100 may be performed in accordance with the present invention in any of the environments depicted in FIGS. 1-4 and 9-10, among others, in various aspects. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various aspects, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where a cognitive network is trained, utilizing metadata associated with historic data threats. In one aspect, the cognitive network may include a neural network such as an artificial neural network (ANN). In another aspect, the metadata associated with historic data threats may be provided as input into the cognitive network, as well as an identification of stored instances of data that are associated with the metadata.

For example, one or more stored instances of data may be determined to be vulnerable to an historic data threat. These stored instances of data may be labeled as vulnerable to the historic data threat, and may be input into the cognitive network along with metadata associated with the historic data threat.

In one aspect, the metadata associated with the historic data threat may include an identification of the historic data threat, one or more types of data susceptible to and/or negatively affected by the historic data threat, one or more locations where the historic data threat has occurred, etc. In yet another aspect, the historic data threat may include one or more instance of malware (e.g., a malware attack, etc.).

In another aspect, metadata associated with the one or more stored instances of data determined to be vulnerable to an historic data threat may be labeled as vulnerable to the historic data threat, and may be input into the cognitive network along with metadata associated with the historic data threat. For example, the metadata associated with a stored instance of data may include metadata stored with the instance of data during the creation or modification of the instance of data. In another example, the metadata associated with the stored instance of data may include one or more of a name of the stored instance of data, an owner of the stored instance of data, a file size of the stored instance of data, a platform in which the stored instance of data is utilized, a last update time for the stored instance of data, etc.

Further, in one aspect, the metadata associated with one or more stored instances of data determined to be vulnerable to an historic data threat may include additional metadata determined by analyzing the stored instances of data. For example, the analysis of a stored instance of data may include one or more of parsing text within the stored instance of data, performing image analysis within the stored instance of data, performing optical character recognition (OCR) for the stored instance of data, converting the stored instance of data to another format (e.g., from a PDF to text, etc.), comparing the stored instance of data to another instance of data, identifying one or more objects within the stored instance of data, etc. In another example, the additional metadata may include one or more topics associated with the stored instance of data, one or more keywords found within the stored instance of data, one or more objects identified within the stored instance of data, etc.

Additionally, method 1100 may proceed with operation 1104, where metadata associated with a current data threat is input into the trained cognitive network. In one aspect, the metadata associated with the current data threat may be extracted from one or more data sources. In another aspect, the one or more data sources may include one or more news sources, one or more blog posts, one or more social media posts, etc. In yet another aspect, the one or more data sources may be parsed in order to identify the metadata associated with the current data threat.

For example, one or more articles, links, or other textual, audio, and/or visual data provided by the one or more data sources may be parsed and/or analyzed in order to determine the metadata associated with the current data threat. In another aspect, the metadata associated with the current data threat may include an identification of the current data threat, one or more types of data susceptible to and/or negatively affected by the current data threat, one or more locations where the current data threat has occurred, etc. In yet another aspect, the current data threat may include one or more instance of malware (e.g., a malware attack, etc.).

Also, method 1100 may proceed with operation 1106, where the trained cognitive network identifies one or more stored instances of data determined to be vulnerable to the current data threat. In one aspect, the trained cognitive network may take the metadata associated with the current data threat as input, and may output an indication of specific stored instances of data determined to be vulnerable to the current data threat.

In another aspect, the trained cognitive network may take the metadata associated with the current data threat as input, and may output metadata determined to be vulnerable to the current data threat. This output metadata may be compared to metadata associated with one or more stored instances of data to determine one or more stored instances of data determined to be vulnerable to the current data threat.

Also, method 1100 may proceed with operation 1108, where one or more security aspects of the one or more stored instances of data determined to be vulnerable to the current data threat are adjusted. In one aspect, one or more security aspects of one or more stored instances of data may be adjusted by changing a sensitivity level for the stored instance of data. In yet another aspect, one or more security aspects of one or more stored instances of data may be adjusted by immediately backing up the stored instance of data. In still another aspect, one or more security aspects of one or more stored instances of data may be adjusted by adjusting one or more data permissions for the stored instance of data.

In this way, data susceptible to a data threat may be cognitively identified and protected in response to the dissemination of information associated with the data threat.

Cognitive—Data Aware Ransomware Mitigation

There have been guidelines and techniques to mitigate and/or minimize the impact of ransomware attacks on enterprise critical data. For example, use of regular backups of the data can minimize the data losses caused by ransomware attacks.

But, there are practical challenges applying these techniques. For example, it is practically challenging to take backups of the whole data, when an organization is generating large quantities of data every day. Also, in some cases ransomware attackers know that nightly backups are taken, so data access may be locked at the end of the day to maximize the impact of an attack. However, an increase the backup frequency may lead to more cost to the backup solution.

In another example, regularly checking and fixing data permissions may be difficult, as practically scanning large quantities of data at regular intervals and checking for appropriate permissions is challenging.

As a solution, business critical data may be identified based on cognitive techniques and data-insights, and based on that information, enhanced and optimized techniques for data-aware mitigation for ransomware attacks may be performed.

A data analysis and management platform may implement techniques to mitigate or minimize the impact of ransomware attack. For example, the data analysis and management platform may provide a real-time view of the data across multiple data-islands in a typical customer data center, based on the system and custom metadata for this data. It also provides techniques to enrich the metadata with data deep inspection, using various cognitive techniques. Thus, based on the data content and custom/enriched metadata we can identify critical data for the organization when the data is created or updated.

If data is determined to be sensitive based on the system definition or user defined sensitivity criteria, the data analysis and management platform can set a frequency of the data backup policy, for the particular data. Setting more frequent backups on data marked with a tag (e.g., a "Sensitive:True" tag, etc.) may minimize business critical data loss in case of a ransomware attack as the most recent copy of critical data may be available on a backup system. In another example, an air gap copy of the critical data may be made based on the data content and custom tags (e.g. sensitive), where an air gap copy entails making a copy on tape, exporting it from a tape library or putting it in a virtual tape vault and updating the state (e.g. file/tape/export info) in the data analysis and management platform.

Also, a live backup may be triggered for highly sensitive data, based on live events.

Additionally, a news consumer may periodically query a news discovery service, and may parse most recent news articles reporting about ransomware attacks and may filter out specific industries or type of data or locations where these attacks are happening using concept extraction and filtering.

Then based on these live triggers, the news consumer may determine potential candidates for similar ransomware attacks based on the live news feeds and may trigger backups of such sensitive documents.

In addition to the enhanced data backup techniques mentioned above, an efficient method is provided to check and toggle data access privileges and set more restrictive permissions for a select set of sensitive files/directories based on data-aware policies, so that these files cannot be modified or erased by other users, including intruders trying to execute a ransomware attack. A ransomware remediation dashboard may also be provided that shows all air-gapped copies of data, based on data classification and tagging such as sensitive, and the location of the latest backup along with associated ransomware remediation data protection policies.

In one aspect, a method for backing up business critical data includes inputting real time data and metadata from across a plurality of data storage systems into a centralized system, performing deep data inspection on the metadata, using cognitive techniques, identifying critical data, and for critically sensitive data based upon the policy, adjusting the backup frequency of said critically sensitive data.

In one aspect, an air gap copy of the critical data may be made based on the data content and custom tags (e.g. indicating the data as sensitive), where an air gap copy entails making a copy on tape, exporting it from the tape library or putting it in a virtual tape vault and updating the state (e.g. file/tape/export info) in the centralized system.

In another aspect, live backups may be triggered for highly sensitive data, based on live events. In yet another aspect, ransomware news events may be monitored to find potential candidates for similar ransomware attacks based on live news feeds, and trigger backups of such sensitive documents.

In another aspect, data access privileges may be checked and adjusted, and more restrictive permissions may be set for a select set of sensitive files/directories based on data-aware policies, so that these files cannot be modified or erased by other users, including intruders trying to execute a ransomware attack.

In another aspect, a ransomware remediation dashboard may show all of the air gapped copies of data, based on data classification and tagging such as "sensitive," and the location of the latest backup along with the associated ransomware remediation data protection policies.

In this way, data to be backed up at higher frequencies may be classified. Additionally, metadata may be captured from source storage devices (e.g., bulk load+live indexing) and inserted into the data analysis and management platform for analysis. Further, source data to be encrypted according to a line of business may be tagged. Further still, deep data analytics may be performed on the source data to gain further insights.

Also, additional tags may be added to the data, based on deep data insights, that depict the level of sensitivity for the data. In addition, advanced queries may be performed to the data analysis and management platform leveraging a corpus of information to drive candidates for backups at varying frequency levels based on data sensitivity levels. In this way, many files may be queried in a short amount of time, which may eliminate a need to scan for encryption.

Further, data may be backed up with an appropriate frequency based on the sensitivity level of the data. Further still, air-gap copies of data may be created utilizing a tape/virtual tape vault. Also, live notifications may be received about an outbreak of ransomware attack in certain industries, and defensive action may be taken immediately based on one or more policies to protect sensitive data with an elevated backup frequency or adjusted data permissions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
training a cognitive network, utilizing metadata associated with historic data threats;
inputting metadata associated with a malicious current data threat into the trained cognitive network, the metadata including an identification of the malicious current data threat, one or more types of data susceptible to and negatively affected by the malicious current data threat, and one or more locations where the malicious current data threat has occurred;

identifying, by the trained cognitive network, one or more stored instances of data determined to be vulnerable to the malicious current data threat,
  wherein the one or more stored instances of data are susceptible to being attacked by the malicious current data threat; and
adjusting one or more security aspects of the one or more stored instances of data determined to be vulnerable to the malicious current data threat, wherein the adjusting includes backing up the one or more stored instances of data determined to be vulnerable to the malicious current data threat according to determined sensitivity level(s) of the one or more stored instances of data.

2. The computer-implemented method of claim 1, wherein the cognitive network includes a neural network.

3. The computer-implemented method of claim 1, wherein the historic data threats include instances of malware attacks, and the metadata associated with the historic data threats includes an identification of the historic data threats, one or more types of data susceptible to and negatively affected by the historic data threats, and one or more locations where the historic data threats have occurred.

4. The computer-implemented method of claim 1, wherein the metadata associated with the historic data threats includes one or more types of data susceptible to the historic data threats.

5. The computer-implemented method of claim 1, wherein the metadata associated with the historic data threats includes one or more locations where the historic data threats have occurred.

6. The computer-implemented method of claim 1, wherein metadata associated with the one or more stored instances of data determined to be vulnerable to the historic data threats are labeled as vulnerable to the historic data threats, and are input into the cognitive network along with metadata associated with the historic data threats.

7. The computer-implemented method of claim 1, wherein the malicious current data threat includes a malware attack, and the metadata associated with the malicious current data threat is extracted from one or more data sources.

8. The computer-implemented method of claim 1, wherein the metadata associated with the malicious current data threat is extracted from one or more news sources, one or more blog posts, and one or more social media posts.

9. The computer-implemented method of claim 1, wherein the trained cognitive network takes the metadata associated with the malicious current data threat as input, and outputs an indication of the one or more stored instances of data determined to be vulnerable to the malicious current data threat.

10. The computer-implemented method of claim 1, wherein the one or more security aspects of the one or more stored instances of data determined to be vulnerable to the malicious current data threat are adjusted by changing a sensitivity level for the one or more stored instances of data.

11. The computer-implemented method of claim 1, wherein the metadata associated with historic data threats includes:
  an identification of the historic data threats,
  one or more locations where the historic data threats have occurred,
  a name of stored instances of data determined to be vulnerable to the historic data threats,
  an owner of the stored instances of data determined to be vulnerable to the historic data threats,
  a file size of the stored instances of data determined to be vulnerable to the historic data threats,
  a platform in which the stored instances of data determined to be vulnerable to the historic data threats is utilized,
  a last update time for the stored instances of data determined to be vulnerable to the historic data threats,
  one or more topics associated with the stored instances of data determined to be vulnerable to the historic data threats,
  one or more keywords found within the stored instances of data determined to be vulnerable to the historic data threats, and
  one or more objects identified within the stored instances of data determined to be vulnerable to the historic data threats.

12. A computer program product comprising one or more computer readable storage media, and program instructions collectively stored on the one or more computer readable storage media, the program instructions comprising instructions configured to cause one or more processors to perform a method comprising:
  training, by the one or more processors, a cognitive network, utilizing metadata associated with historic data threats;
  inputting, by the one or more processors, metadata associated with a malicious current data threat into the trained cognitive network, the metadata including an identification of the malicious current data threat, one or more types of data susceptible to and negatively affected by the malicious current data threat, and one or more locations where the malicious current data threat has occurred;
  identifying, by the one or more processors and the trained cognitive network, one or more stored instances of data determined to be vulnerable to the malicious current data threat; and
  adjusting, by the one or more processors, one or more security aspects of the one or more stored instances of data determined to be vulnerable to the malicious current data threat, wherein the adjusting includes backing up the one or more stored instances of data determined to be vulnerable to the malicious current data threat according to determined sensitivity level(s) of the one or more stored instances of data.

13. The computer program product of claim 12, wherein the cognitive network includes a neural network.

14. The computer program product of claim 12, wherein the metadata associated with the historic data threats includes an identification of the historic data threats.

15. The computer program product of claim 12, wherein the metadata associated with the historic data threats includes one or more types of data susceptible to the historic data threats.

16. The computer program product of claim 12, wherein metadata associated with the one or more stored instances of data determined to be vulnerable to the historic data threats are labeled as vulnerable to the historic data threats, and are input into the cognitive network along with metadata associated with the historic data threats.

17. The computer program product of claim 12, wherein the metadata associated with the malicious current data threat is extracted from one or more data sources.

18. The computer program product of claim 12, wherein the metadata associated with the malicious current data threat is extracted from one or more news sources, one or more blog posts, and one or more social media posts, and the program instructions comprising instructions configured to cause the one or more processors to perform the method comprising: determining, by the one or more processors, the sensitivity level(s) of the one or more stored instances of data.

19. The computer program product of claim 12, wherein the trained cognitive network takes the metadata associated with the malicious current data threat as input, and outputs an indication of the one or more stored instances of data determined to be vulnerable to the malicious current data threat.

20. A system, comprising:
a processor; and
logic integrated with the processor, executable by the processor, or integrated with and executable by the processor, the logic being configured to:
train a cognitive network, utilizing metadata associated with historic data threats;
input metadata associated with a malicious current data threat into the trained cognitive network, the metadata including an identification of the malicious current data threat, one or more types of data susceptible to and negatively affected by the malicious current data threat, and one or more locations where the malicious current data threat has occurred;
identify, by the trained cognitive network, one or more stored instances of data determined to be vulnerable to the malicious current data threat; and
backing up, by the trained cognitive network, the one or more stored instances of data determined to be vulnerable to the malicious current data threat, wherein data determined to be vulnerable to the malicious current data threat and to have a higher level of sensitivity is backed up at a higher frequency than data determined to be vulnerable to the malicious current data threat and to have a lower level of sensitivity.

21. The system of claim 20, wherein the metadata includes: an identification of the malicious current data threat, one or more types of data susceptible to and negatively affected by the malicious current data threat, and one or more locations where the malicious current data threat has occurred.

22. A computer-implemented method, comprising:
training a cognitive network, including providing, as input into the cognitive network, metadata associated with an historic data threat, including:
an identification of the historic data threat,
one or more locations where the historic data threat has occurred,
a name of a stored instance of data determined to be vulnerable to the historic data threat,
an owner of the stored instance of data determined to be vulnerable to the historic data threat,
a file size of the stored instance of data determined to be vulnerable to the historic data threat,
a platform in which the stored instance of data determined to be vulnerable to the historic data threat is utilized,
a last update time for the stored instance of data determined to be vulnerable to the historic data threat,
one or more topics associated with the stored instance of data determined to be vulnerable to the historic data threat,
one or more keywords found within the stored instance of data determined to be vulnerable to the historic data threat, and
one or more objects identified within the stored instance of data determined to be vulnerable to the historic data threat;
inputting into the trained cognitive network, metadata associated with a current data threat, including:
an identification of the current data threat,
one or more types of data susceptible to and negatively affected by the current data threat, and
one or more locations where the current data threat has occurred;
identifying, by the trained cognitive network, metadata determined to be vulnerable to the current data threat;
comparing the metadata determined to be vulnerable to the current data threat to metadata associated with one or more stored instances of data to determine one or more stored instances of data determined to be vulnerable to the current data threat; and
adjusting one or more security aspects of the one or more stored instances of data determined to be vulnerable to the current data threat.

23. The computer-implemented method of claim 22, wherein adjusting one or more security aspects of the one or more stored instances of data determined to be vulnerable to the current data threat includes immediately backing up one or more stored instances of data determined to be vulnerable to the current data threat.

24. The computer-implemented method of claim 22, wherein adjusting one or more security aspects of the one or more stored instances of data determined to be vulnerable to the current data threat includes changing a sensitivity level for the one or more stored instances of data determined to be vulnerable to the current data threat.

25. A computer program product comprising one or more computer readable storage media, and program instructions collectively stored on the one or more computer readable storage media, the program instructions comprising instructions configured to cause one or more processors to perform a method comprising:
training, by the one or more processors, a cognitive network, including providing, as input into the cognitive network, metadata associated with an historic data threat, including:
an identification of the historic data threat,
one or more locations where the historic data threat has occurred,
a name of a stored instance of data determined to be vulnerable to the historic data threat,
an owner of the stored instance of data determined to be vulnerable to the historic data threat,
a file size of the stored instance of data determined to be vulnerable to the historic data threat,
a platform in which the stored instance of data determined to be vulnerable to the historic data threat is utilized,
a last update time for the stored instance of data determined to be vulnerable to the historic data threat,
one or more topics associated with the stored instance of data determined to be vulnerable to the historic data threat,
one or more keywords found within the stored instance of data determined to be vulnerable to the historic data threat, and
one or more objects identified within the stored instance of data determined to be vulnerable to the historic data threat;
inputting into the trained cognitive network, by the one or more processors, metadata associated with a current data threat, including:

an identification of the current data threat,
one or more types of data susceptible to and negatively affected by the current data threat, and
one or more locations where the current data threat has occurred;
identifying, by the one or more processors and the trained cognitive network, metadata determined to be vulnerable to the current data threat;
comparing, by the one or more processors, the metadata determined to be vulnerable to the current data threat to metadata associated with one or more stored instances of data to determine one or more stored instances of data determined to be vulnerable to the current data threat; and
adjusting, by the one or more processors, one or more security aspects of the one or more stored instances of data determined to be vulnerable to the current data threat.

\* \* \* \* \*